United States Patent
Delaney et al.

(10) Patent No.: US 12,199,986 B2
(45) Date of Patent: Jan. 14, 2025

(54) CONTEXT BASED DATA SHARING

(71) Applicant: Lenovo (United States) Inc., Morrisville, NC (US)

(72) Inventors: Mark Delaney, Raleigh, NC (US); Matthew Fardig, Boonville, IN (US)

(73) Assignee: Lenovo (United States) Inc., Morrisville, NC (US)

( * ) Notice: Subject to any disclaimer, the term of this patent is extended or adjusted under 35 U.S.C. 154(b) by 161 days.

(21) Appl. No.: 17/553,207

(22) Filed: Dec. 16, 2021

(65) Prior Publication Data
US 2023/0198989 A1   Jun. 22, 2023

(51) Int. Cl.
| | |
|---|---|
| *H04L 12/70* | (2013.01) |
| *H04L 9/40* | (2022.01) |
| *H04L 67/12* | (2022.01) |
| *H04L 67/55* | (2022.01) |
| *H04L 67/60* | (2022.01) |

(52) U.S. Cl.
CPC ........... *H04L 63/101* (2013.01); *H04L 67/12* (2013.01); *H04L 67/55* (2022.05); *H04L 67/60* (2022.05)

(58) Field of Classification Search
CPC ....... H04L 63/101; H04L 67/12; H04L 67/55; H04L 67/60
USPC .......................................................... 726/4
See application file for complete search history.

(56) References Cited

U.S. PATENT DOCUMENTS

| | | | |
|---|---|---|---|
| 11,587,130 B1 * | 2/2023 | Gross | H04L 67/306 |
| 2014/0254548 A1 * | 9/2014 | Hughes | H04W 12/065 370/331 |
| 2016/0212138 A1 * | 7/2016 | Lehane | G06F 21/10 |
| 2017/0215031 A1 * | 7/2017 | Harding | G01C 21/3667 |
| 2020/0036816 A1 * | 1/2020 | Babu J D | A63F 13/352 |
| 2021/0126823 A1 * | 4/2021 | Poess | H04L 67/306 |
| 2021/0204115 A1 * | 7/2021 | Gorsica, IV | H04W 4/70 |
| 2021/0326586 A1 * | 10/2021 | Sorci | G16H 30/40 |
| 2022/0094745 A1 * | 3/2022 | Dachille | G06F 21/6245 |
| 2022/0114246 A1 * | 4/2022 | El Guindi | H04L 63/0435 |
| 2022/0157408 A1 * | 5/2022 | Vuu | G01N 33/0047 |
| 2022/0207128 A1 * | 6/2022 | Sen | G06F 21/6218 |
| 2023/0140584 A1 * | 5/2023 | Stenneth | G01C 21/3878 701/423 |

* cited by examiner

*Primary Examiner* — Ario Etienne
*Assistant Examiner* — Elizabeth Kassa
(74) *Attorney, Agent, or Firm* — FERENCE & ASSOCIATES LLC

(57) ABSTRACT

One embodiment provides a method, including: capturing, using at least one sensor associated with an information handling device, sensor data; identifying, at the information handling device, a request to share the sensor data from the information handling device with another entity; determining, using a processor, whether context data associated with the information handling device satisfies one or more predetermined criteria outlined in a data sharing permissions list; and providing, responsive to determining that the context data does satisfy the one or more predetermined criteria, a notification to a user of the information handling device of the determination. Other aspects are described and claimed.

12 Claims, 3 Drawing Sheets

CONTEXT BASED DATA SHARING

BACKGROUND

Information handling devices ("devices"), for example smart phones, tablet devices, wearable devices, hybrid devices, laptops, desktop computers, and the like, are capable of capturing a wide array of data. More particularly, devices may be equipped with one or more sensors that can capture image data, audio data, motion data, user position data, other data types, and the like. This captured data can then be shared with other devices (e.g., the data can be shared automatically or in response to user permission to share, etc.).

BRIEF SUMMARY

In summary, one aspect provides a method, including: capturing, using at least one sensor associated with an information handling device, sensor data; identifying, at the information handling device, a request to share the sensor data from the information handling device with another entity; determining, using a processor, whether context data associated with the information handling device satisfies one or more predetermined criteria outlined in a data sharing permissions list; and providing, responsive to determining that the context data does satisfy the one or more predetermined criteria, a notification to a user of the information handling device of the determination.

Another aspect provides an information handling device, including: at least one sensor; a processor; a memory device that stores instructions executable by the processor to: capture, using the at least one sensor, sensor data; identify a request to share the sensor data from the information handling device with another entity; determine whether context data associated with the information handling device satisfies one or more predetermined criteria outlined in a data sharing permissions list; and provide, responsive to determining that the context data does satisfy the one or more predetermined criteria, a notification to a user of the information handling device of the determination.

A further aspect provides a product, including: a storage device that stores code, the code being executable by a processor and comprising: code that captures sensor data for an information handling device; code that identifies a request to share the sensor data from the information handling device with another entity; code that determines whether context data associated with the information handling device satisfies one or more predetermined criteria outlined in a data sharing permissions list; and code that provides, responsive to determining that the context data does satisfy the one or more predetermined criteria, a notification to a user of the information handling device of the determination.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
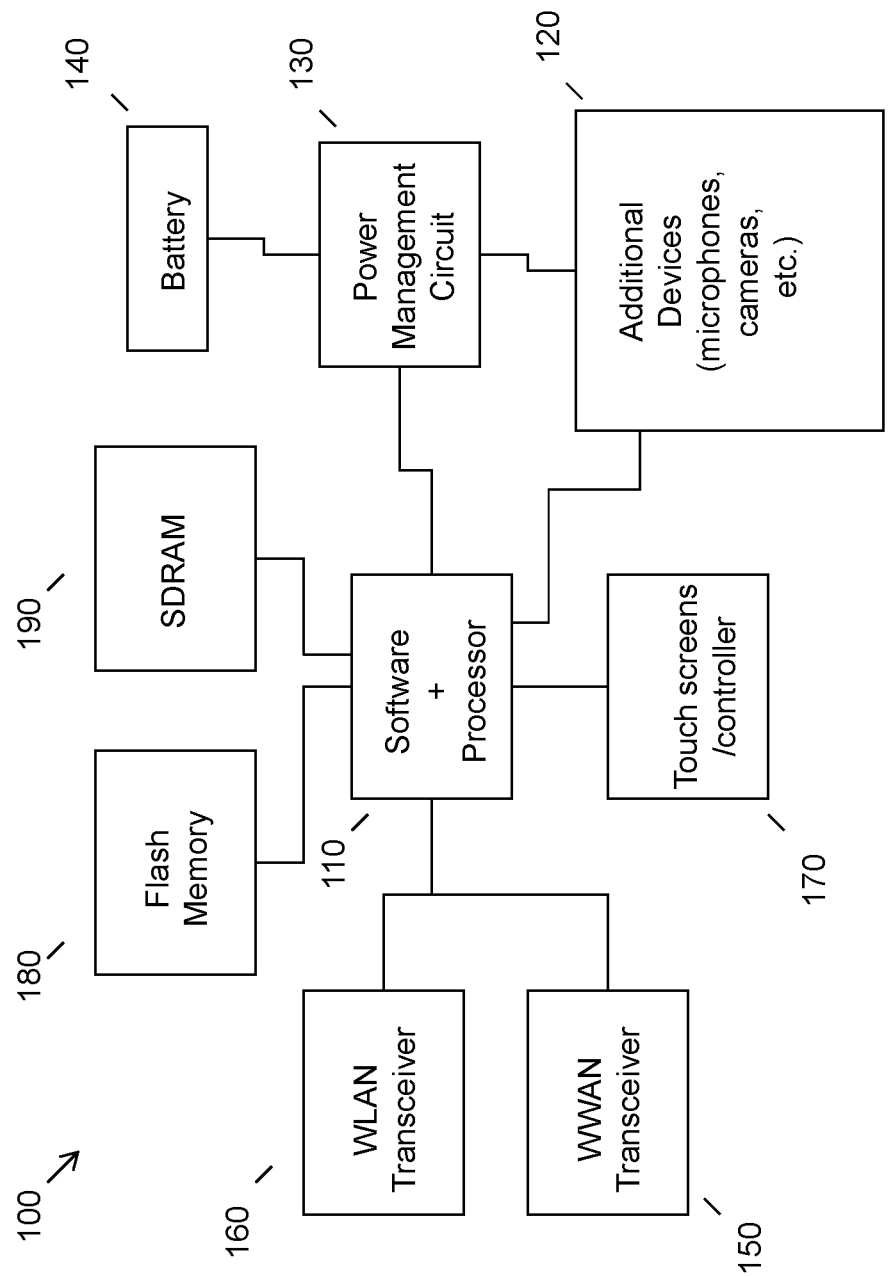
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As technology has progressed, the incorporation of various types of sensors into devices and objects (e.g., personal devices, infrastructure, vehicles, appliances, etc.) has become prevalent. These sensors are capable of capturing a variety of different types of data associated with the contextual surroundings of the device. Potential data types that may be captured by device sensors include image data, audio data, motion data, user position data, signal and/or connectivity data, other data types, and the like. Once captured, this data may be processed for utilization in the performance of one or more downstream functions or it may be shared with one or more other sources (e.g., other devices, systems, entities, etc.).

Conventionally, data sharing between devices has been largely binary in nature. More particularly, a user may either opt in or out of having their data shared (e.g., for a predetermined amount of time, while the device is in a predetermined location, etc.). However, such a rigid data sharing structure may not always work well in all situations. For instance, although a user may not want certain device data to be shared with an external entity all the time, they may be amenable to having that data shared with the external entity in specific circumstances. The sharing of this data may allow the other entity to: identify certain issues with a service, improve their service, facilitate quicker completion of a task, and the like. A permission solution is therefore required that enables a user to opt into sharing of their device data with an external entity in certain contextual circumstances.

Accordingly, an embodiment provides a method for sharing certain types of device data with another entity. In an embodiment, sensor data may be captured by a device. An embodiment may also identify a request to share the sensor data with another entity (e.g., another device, etc.). An embodiment may then determine whether context data associated with the device satisfies one or more predetermined criteria outlined in a data sharing permissions list. The predetermined criteria may specify which types of context data need to be present in order for the sensor data to be shared with the other entity. Responsive to determining that the context data satisfies the predetermined criteria, an embodiment may provide a notification of this determination to a user and/or automatically transmit the relevant sensor data to the another entity. Such a method preserves a user's privacy while still allowing certain device data to be shared in specific contextual circumstances.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes an augmented reality device 170 for data input and display/rendering. System 100 also typically includes various memory devices, for example flash memory 180 and SDRAM 190.

Figure 2:
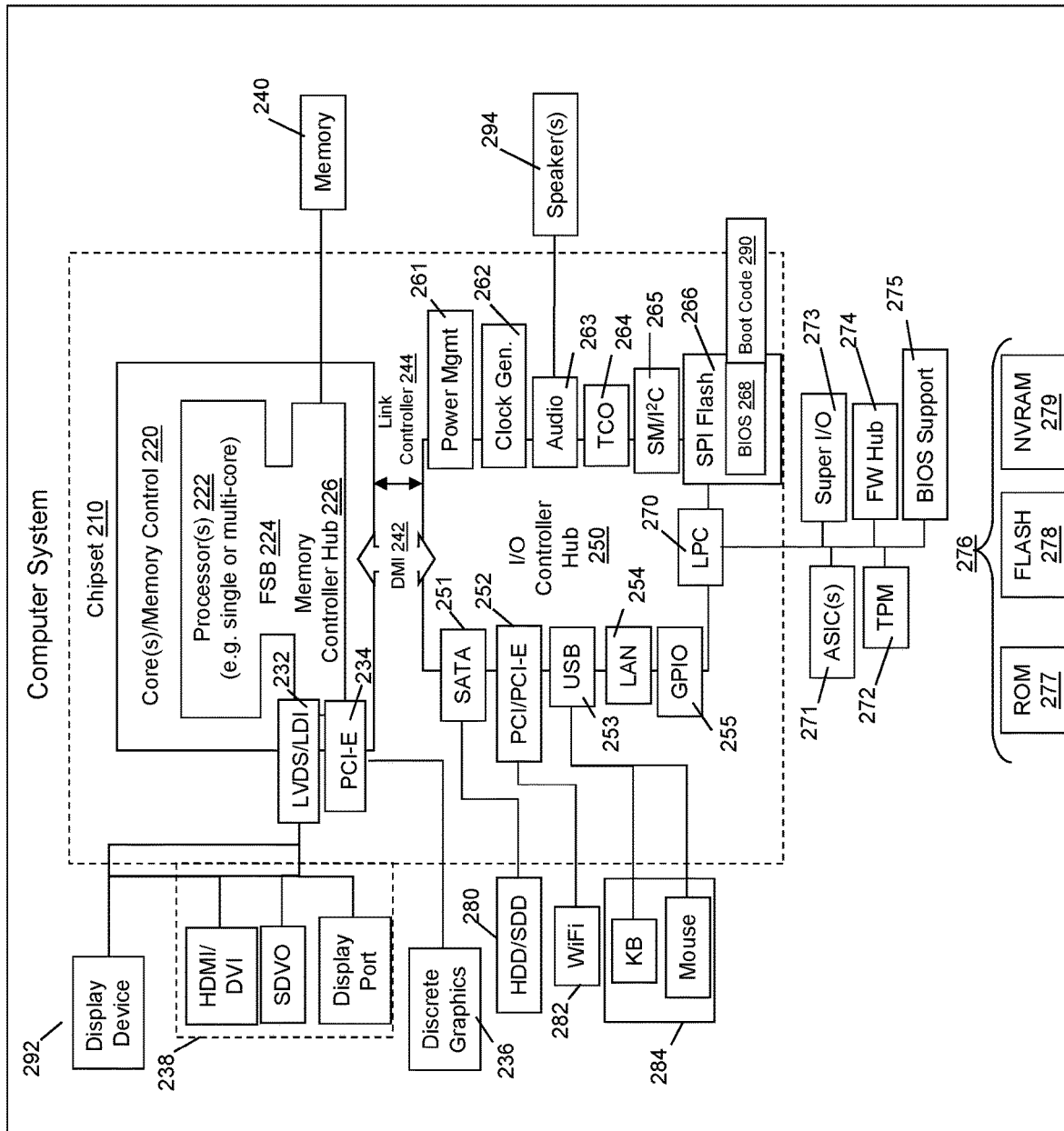
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in virtually any device outfitted with at least one sensor. For example, the circuitry outlined in FIG. 1 may be implemented in a smart phone, whereas the circuitry outlined in FIG. 2 may be implemented in a personal computer embodiment.

Figure 3:
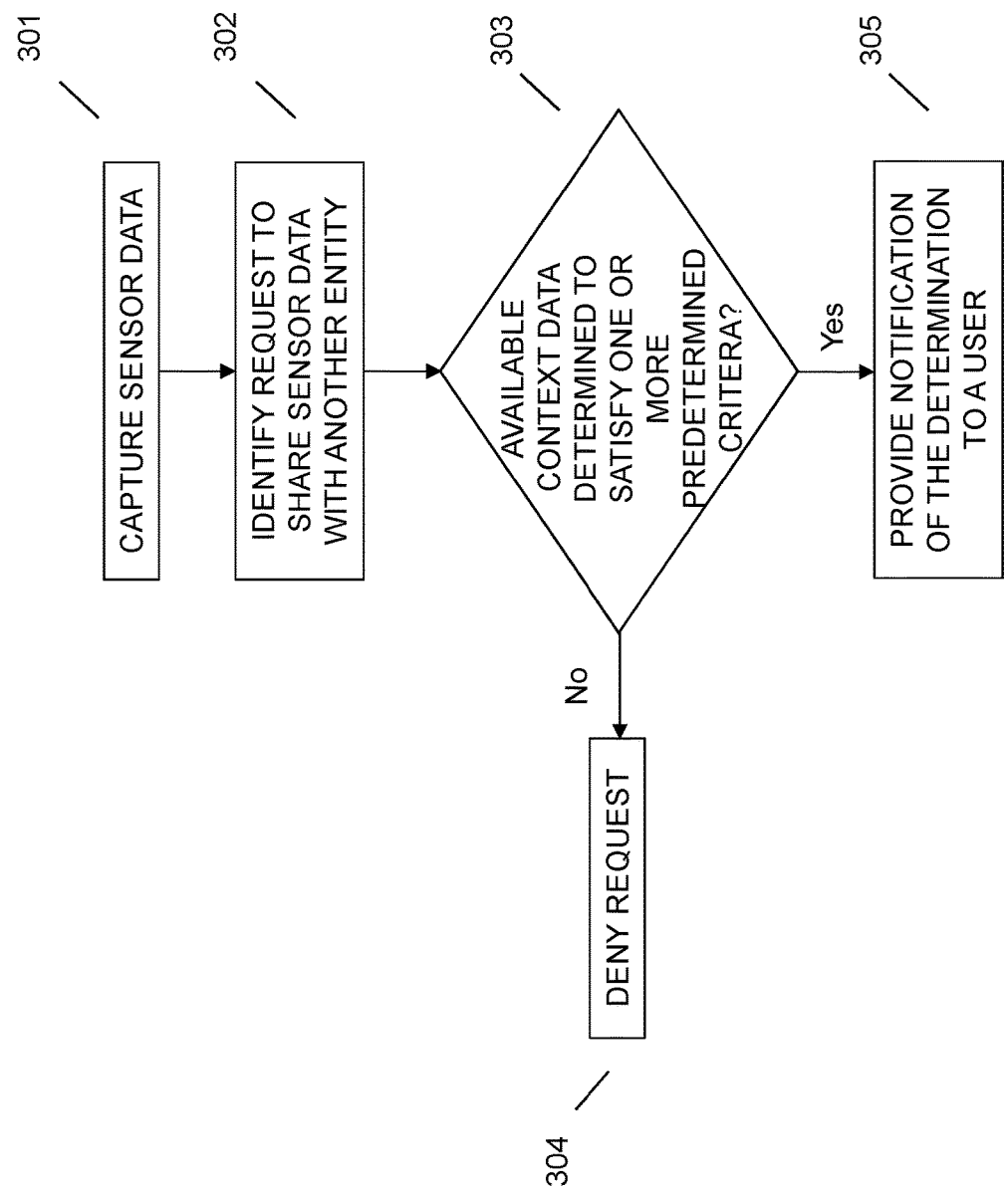
FIG. 3 illustrates an example method of sharing data with another entity via context-based permissioning.

Referring now to FIG. 3, an embodiment is disclosed in which captured sensor data is shared in contextually appropriate situations. At 301, an embodiment may capture sensor data at a device using one or more integrally or operatively coupled sensors. Non-limiting types of sensor data that may be captured include: image data (e.g., images or videos of a devices' location, etc.) captured by one or more front-facing or worldview cameras, audio data (e.g., user voice data, ambient audio data, etc.) captured by one or more microphones, device motion data detected by an integrated accelerometer or gyroscope, user location data based on Global Positioning System (GPS) data, signal data from other proximate devices, connectivity data to a Wi-Fi or mobile network, any combination of the foregoing, and the like.

In an embodiment, a user's device may be configured to capture the sensor data substantially continuously. Alternatively, the user's device may be configured to only capture the sensor data when a predetermined contextual situation is present. For example, an embodiment may only capture sensor data when: the user's device is determined to be in a predetermined location, it is a predetermined time of day, aspects of the user's device reach specific thresholds (e.g., a battery level is at a predetermined percentage, a signal strength is at a predetermined level, etc.), and the like.

At 302, an embodiment may identify a request to share the sensor data with another entity. In an embodiment, the other entity may correspond to one or more of: another device, a group of devices, a specific individual or group of individuals, a company or organization, and the like. In an embodiment, the request may be a single request to share data or a standing request request to share data. With respect to the latter, the standing request may correspond to a continual request by the other entity to share data over a predetermined period of time (e.g., an hour, a day, a week, etc.) and/or while a device is present in a predetermined location (e.g., in a specific geographic area, etc.)

At 303, an embodiment may determine whether context data associated with the device satisfies one or more predetermined criteria outlined in a data sharing permissions list. In an embodiment, the data sharing permissions list may be stored at an accessible storage location (e.g., locally on the device, remotely on another device or server, etc.). In an embodiment, the one or more predetermined criteria may be originally set by a manufacturer of the device and/or may later be adjusted by a user (e.g., via navigation through a settings menu, etc.).

In an embodiment, the context data may be one or more of a variety of different data types. For example, the context data may include some or all aspects of the captured sensor data as described above. Additionally or alternatively, the context data may include various types of device characteristic data such as power level data, wireless network signal data, active application data, and the like. Additionally or alternatively, the context data may include data associated with a specific region a device is in such as a traffic data, weather data, alert data (e.g., amber alert data, severe weather alert data, etc.), and the like.

Responsive to determining, at 303, that the context data does not satisfy the one or more predetermined criteria, an embodiment may, at 304, deny the request to share data. More particularly, an embodiment may not share the requested data with the other entity. Additionally or alternatively, an embodiment may transmit a message to the user of the device and/or the other entity informing them that the requested sensor data could not be shared and/or may provide reasons in the message why the data could not be shared. Conversely, responsive to determining, at 303, that the context data does satisfy the one or more predetermined criteria, an embodiment may, at 305, provide an indication of the determination result to a user of the device.

In an embodiment, provision of the indication may manifest as a visual and/or audible notification (e.g., a push notification presented on a display screen of the user's device, an audible message, etc.). The notification may identify the entity requesting to receive the sensor data and/or the specific types of sensor data that were requested to be shared. In an embodiment, the notification may contain a suggestion that prompts the user to share the relevant sensor data with the other entity. For example, the notification may contain a "share" button that, when selected by the user, will provide an indication to the system to transmit the relevant data to the other entity. In such an embodiment, no sensor data may be shared until the confirmation selection is detected. Conversely, an embodiment may automatically share the sensor data with the other entity simply in response to determining that the context data satisfies the one or more predetermined criteria.

Pluralities of practical implementations of the foregoing concepts are described below. It is important to note that these example implementations are non-limiting and the inventive concepts may be incorporated into other use-cases not explicitly described here.

In one example, a cell phone carrier ("carrier") may want to identify problem areas in their network coverage (i.e., areas in the network where the signal is bad). To facilitate the identification, the carrier may want to receive location data from all devices whose signal strength falls below a predetermined threshold. A user may accordingly permission their device to share its location with the carrier only when the signal strength of their device falls below the predetermined threshold. At all times when the signal strength of the device is greater than the predetermined threshold, the location data is kept private.

In another example, a new restaurant may want to test the acoustics and sound levels across different locations within their venue (i.e., to identify areas of the restaurant where the sound may be too loud). To facilitate this testing, the restaurant may want to receive a device's location data when the captured sound data is greater than 80 decibels. A user may accordingly permission their device to share its location with the restaurant only when the sound is detected that is greater than 80 decibels. Such allowances may allow the restaurant to better plan seating and sound arrangement within the space.

In yet another example, many modern vehicles are equipped with exterior cameras that are capable of capturing images and videos of proximate objects (e.g., other proximate vehicles, license plates on those vehicles, etc.). A system of a user's vehicle may keep this information private unless a specific contextual situation arises. For example, an embodiment may be configured to share certain types of captured sensor data with a local authority in response to receiving a specific type of alert (e.g., an Amber alert, etc.). In such a situation, a user may permission their vehicle's system to release, for example, captured image data of an individual, a license plate, etc., when that image data matches the information contained in the Amber alert.

The various embodiments described herein thus represent a technical improvement to conventional methods for sharing device data. Using the techniques described herein, an embodiment may capture one or more types of sensor data. Responsive to identifying a request to share the captured sensor data with another entity, an embodiment may determine whether context data associated with their device satisfies one or more predetermined criteria outlined in a data sharing permissions list. If a positive determination is reached, an embodiment may then automatically share the relevant data with the requesting entity and/or provide an indication to a user informing them of the determination. Such a method may aid other entities in accomplishing certain goals while still maintaining a user's privacy.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
capturing, using at least one sensor associated with an information handling device, sensor data, wherein the capturing the sensor data comprises capturing the sensor data responsive to identifying that the information handling device is associated with a predetermined contextual situation, wherein the predetermined contextual situation is selected from the group consisting of a predetermined location, a predetermined time, and a predetermined device setting;
identifying, at the information handling device, a request to share the sensor data with another entity that receives and aggregates sensor data from a plurality of information handling devices, wherein the request identifies at least one condition associated with the request for provision of the sensor data and the at least one condition identifying when the sensor data is requested by the another entity, wherein the request is a standing request from the another entity;
determining, using a processor, that the predetermined contextual situation satisfies one or more predetermined criteria outlined in a data sharing permissions list associated with the information handling device and that the at least one condition associated with the request is met, wherein the one or more predetermined criteria outlined in the data sharing permissions list is adjustable by the user; and
automatically sharing, responsive to determining that the context data does satisfy the one or more predetermined criteria and that the at least one condition is met, the sensor data with the another entity, wherein the automatically sharing comprises providing a notification to a user of the information handling device of the determination along with the sensor data.

2. The method of claim 1, wherein the request is one of a single request or a standing request.

3. The method of claim 1, wherein the sensor data is selected from the group of image data, audio data, motion data, user location data, signal data, connectivity data, and combinations thereof.

4. The method of claim 1, wherein the notification comprises a suggestion that the user share the sensor data with the another entity.

5. The method of claim 1, further comprising denying, responsive to determining that the context data does not satisfy the one or more predetermined criteria, the request to share the sensor data with the another entity.

6. The method of claim 1, further comprising sharing, responsive to receiving user confirmation input in response to the notification, the sensor data with the another entity.

7. An information handling device, comprising:
at least one sensor;
a processor;
a memory device that stores instructions executable by the processor to:

capture, using the at least one sensor, sensor data, wherein the capturing the sensor data comprises capturing the sensor data responsive to identifying that the information handling device is associated with a predetermined contextual situation, wherein the predetermined contextual situation is selected from the group consisting of a predetermined location, a predetermined time, and a predetermined device setting;

identify a request to share the sensor data with another entity that receives and aggregates sensor data from a plurality of information handling devices, wherein the request identifies at least one condition associated with the request for provision of the sensor data and the at least one condition identifying when the sensor data is requested by the another entity, wherein the request is a standing request from the another entity;

determine that the predetermined contextual situation satisfies one or more predetermined criteria outlined in a data sharing permissions list associated with the information handling device and that the at least one condition associated with the request is met, wherein the one or more predetermined criteria outlined in the data sharing permissions list is adjustable by the user; and automatically share, responsive to determining that the context data does satisfy the one or more predetermined criteria and that the at least one condition is met, the sensor data with the another entity, wherein the automatically sharing comprises providing a notification to a user of the information handling device of the determination along with the sensor data.

8. The information handling device of claim 7, wherein the request is one of a single request or a standing request.

9. The information handling device of claim 7, wherein the sensor data is selected from the group of image data, audio data, motion data, user location data, signal data, connectivity data, and combinations thereof.

10. The information handling device of claim 7, wherein the notification comprises a suggestion that the user share the sensor data with the another entity.

11. The information handling device of claim 7, wherein the instructions are further executable by the processor to deny, responsive to determining that the context data does not satisfy the one or more predetermined criteria, the request to share the sensor data with the another entity.

12. The information handling device of claim 7, wherein the instructions are further executable by the processor to share, responsive to receiving user confirmation input in response to the notification, the sensor data with the another entity.

* * * * *